J. K. REINER.
Churn.
No. 60,058.
Patented Nov. 27, 1866.
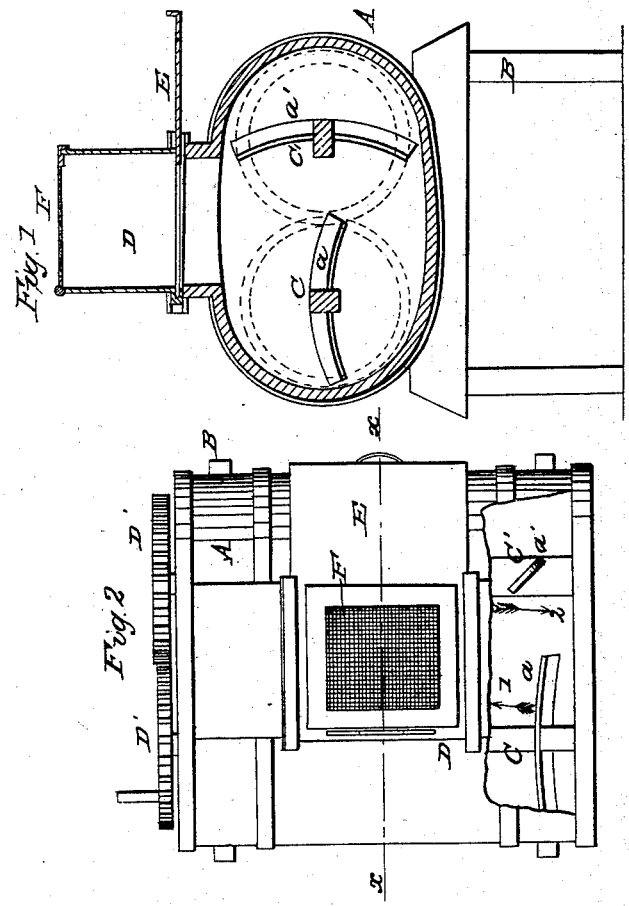
Witnesses
F. A. Jackson
Wm. Trewin
Inventor
Joel K. Reiner
Per Munn & Co
Attorneys

United States Patent Office.

IMPROVEMENT IN CHURNS.

JOEL K. REINER, OF LINE LEXINGTON, PENNSYLVANIA.

*Letters Patent No. 60,058, dated November 27, 1866.*

SPECIFICATION.

TO ALL WHOM IT MAY CONCERN:

Be it known that I, JOEL K. REINER, of Line Lexington, in the county of Montgomery, and State of Pennsylvania, have invented a new and improved Churn; and I do hereby declare that the following is a full, clear, and exact description thereof, which will enable others skilled in the art to make and use the same, reference being had to the accompanying drawing, forming a part of this specification, in which—

Figure 1 is a transverse vertical section of my invention taken in the line $x\ x$, fig. 2.

Figure 2, a plan or top view of the same.

Similar letters of reference indicate like parts.

This invention consists in constructing the body of the churn or cream receptacle of oval form in its transverse section, the receptacle being placed longitudinally in a suitable support, and provided with two longitudinal shafts having curved arms attached, which have an oblique position in their transverse section, the arms of one shaft having an opposite oblique position with those of the other, and the two shafts connected by gears at one end, whereby the cream, as the two shafts are rotated, will be forced toward each end of the cream receptacle, and agitated in such a manner as to cause butter to be produced in a short space of time. The invention also consists in having a chamber or butter receptacle attached or applied to the cream receptacle, the butter receptacle having a strainer at its outer, and provided with a slide at its inner end, as hereinafter fully shown and described, whereby the butter may be readily separated from the butter-milk.

A represents the body of the churn, or the cream receptacle, which may be constructed of wood, and of oval form in its transverse section. This cream receptacle may be of any suitable dimensions, and it is placed horizontally upon a suitable support, B. Within the cream receptacle A, there are placed longitudinally, two shafts, C C', which pass through one end of the cream receptacle A, and are connected by gears, D, of equal diameter, to one of which the power is applied. The shafts C C' have arms, $a\ a'$, fitted in them. These arms are of curved form longitudinally, and they are fitted in the shafts C C' so as to project at equal distances from them at opposite sides, as shown clearly in both figures. The arms have an oblique position in their transverse section, as shown clearly in fig. 2, the arms $a$ of one shaft, C, having a reverse oblique position to the arms $a'$ of the other shaft, C', and the arms of one shaft are placed opposite the centres of the spaces between the arms of the other shaft. By this arrangement it will be seen that when the receptacle A is supplied with cream, and the shafts C C' rotated, the arms $a$ of the shaft C will force the cream towards one end of the receptacle, as indicated by arrow 1, while the arms $a'$ of the other shaft, C', will force the cream towards the other end of the receptacle, as indicated by arrow 2, the two currents, at the same time, being broken or driven by the rotating motion of the arms, through one another, thereby effecting a violent agitation of the cream, and an expeditious production of the butter. On the top of the receptacle A, there is a chamber, D, which may be constructed of wood or metal. This chamber, D, has a slide, E, at its inner end, by adjusting which the chamber may be made to communicate with the cream receptacle, A, or be cut off from it entirely. The top or outer end of the chamber, D, is provided with a strainer or screen, F, of wire gauze or other material. When the churning operation is being performed, the slide E is shoved inward to cut off the communication between the cream receptacle and the chamber D, and after the butter is produced, the slide E is drawn out and the cream receptacle, A, turned around on its support, B, and the butter-milk will pass through the strainer or screen, F, the butter, which cannot pass through the screen, being retained in the chamber D, from which it may be taken or removed with the greatest facility. By this simple arrangement the usual delay of "gathering" the butter by a slow movement of the dasher is avoided, the separation being effected in a very short period of time, and without any difficulty whatever.

I claim as new, and desire to secure by Letters Patent—

1. The two rotating shafts, C C', provided with curved arms, $a\ a'$, having an oblique position in their transverse section, and the arms of one shaft having a reverse oblique position to those of the other, substantially as and for the purpose specified.

2. The butter chamber, D, applied to the cream receptacle A, and provided with the slide E and the strainer or screen F, substantially as and for the purpose set forth.

The above specification of my invention signed by me this third day of August, 1866.

JOEL K. REINER.

Witnesses:
WM. E. EWING,
A. H. DELP.